US012811308B2

(12) United States Patent
Biswas et al.

(10) Patent No.: US 12,811,308 B2
(45) Date of Patent: *Nov. 24, 2026

(54) HIGH-GAIN, HEMI-SPHERICAL COVERAGE, MULTI-SIDED FLATTENED LUNEBURG LENS ANTENNA

(71) Applicant: APOTHYM TECHNOLOGIES GROUP, LLC (ATG), Peachtree Corners, GA (US)

(72) Inventors: Soumitra Biswas, Peachtree Corners, GA (US); Howard Jetmundsen, Peachtree Corners, GA (US); Shawn Rogers, Johns Creek, GA (US)

(73) Assignee: APOTHYM TECHNOLOGIES GROUP, LLC, Peachtree Corners, GA (US)

( * ) Notice: Subject to any disclaimer, the term of this patent is extended or adjusted under 35 U.S.C. 154(b) by 7 days.

This patent is subject to a terminal disclaimer.

(21) Appl. No.: 19/190,290

(22) Filed: Apr. 25, 2025

(65) Prior Publication Data

US 2025/0253540 A1 Aug. 7, 2025

Related U.S. Application Data

(63) Continuation of application No. 17/926,091, filed as application No. PCT/US2021/033239 on May 19, 2021, now Pat. No. 12,300,890.

(Continued)

(51) Int. Cl.

*H01Q 19/06* (2006.01)
*H01Q 3/24* (2006.01)

(Continued)

(52) U.S. Cl.

CPC ........... *H01Q 19/062* (2013.01); *H01Q 3/245* (2013.01); *H01Q 15/08* (2013.01); *H01Q 25/00* (2013.01)

(58) Field of Classification Search

CPC .......... H01Q 3/24; H01Q 3/242; H01Q 3/245; H01Q 3/46; H01Q 15/02; H01Q 15/08;

(Continued)

(56) References Cited

U.S. PATENT DOCUMENTS 5,781,163 A 7/1998 Ricardi
8,854,257 B2 10/2014 Hamner (Continued)

FOREIGN PATENT DOCUMENTS

WO 2019060596 A2 3/2019

OTHER PUBLICATIONS

International Search Report and Written Opinion issued in International Application No. PCT/US2021/033239 (Aug. 16, 2021).

*Primary Examiner* — Robert Karacsony

(74) *Attorney, Agent, or Firm* — McBee, Moore & Vanik IP, LLC

(57) ABSTRACT

A multiple flat sided modified Luneburg Lens antenna to provide a broadband and hemi-spherical coverage. The Modified Luneburg Lens antenna has a flat surface at the bottom and quadrilateral/hexagonal/octagonal/decagon/dodecagon flat surfaces at the sides (e.g., "cupcake shaped") to manipulate the signal directivity of a radio frequency transmission or reception of interest in a plurality of octaves of bandwidth. The antenna may be configured with a Planar Ultra-Wideband Modular Array (PUMA) Antenna array structure with a broadband anti-reflective layer added between the two devices. The anti-reflective layer marries the two devices (lens and PUMA) and creates a broadband impedance matching between the new modified Luneburg lens antenna and dipoles of the PUMA array while maintaining the capability of the system to transmit and receive signals in a plurality of octaves of bandwidth.

16 Claims, 10 Drawing Sheets

Related U.S. Application Data

(60) Provisional application No. 63/027,142, filed on May 19, 2020.

(51) Int. Cl.
*H01Q 15/08* (2006.01)
*H01Q 25/00* (2006.01)

(58) Field of Classification Search
CPC ...... H01Q 15/10; H01Q 19/06; H01Q 19/062; H01Q 19/09; H01Q 25/00
See application file for complete search history.

(56) References Cited

U.S. PATENT DOCUMENTS

| | | | |
|---|---|---|---|
| 9,590,300 | B2 | 3/2017 | Artemenko |
| 2012/0146869 | A1 | 6/2012 | Holland |
| 2020/0119868 | A1 | 4/2020 | Rakib |

HIGH-GAIN, HEMI-SPHERICAL COVERAGE, MULTI-SIDED FLATTENED LUNEBURG LENS ANTENNA

CROSS-REFERENCE TO RELATED APPLICATIONS

This patent application is a Continuation application of U.S. application Ser. No. 17/926,091, filed 17 Nov. 2022, which is United States national stage application under 35 U.S.C. 371 of International Application No. PCT/US2021/033239, filed on 19 May 2021, which claims priority to U.S. Provisional Patent Application No. 63/027,142, filed on 19 May 2020, entire contents of each of which are incorporated herein by reference.

FIELD OF THE INVENTION

This disclosure relates to communications and radar antenna technology, and more particularly to multiband microwave electronically steered lens antennas with relatively high gain and wide beamscanning angle.

BACKGROUND OF THE INVENTION

Satellite communications (SATCOM) and terrestrial microwave communications systems such as microwave line-of-sight, cellular, and tactical networking typically require the use of transmitter/receivers connected to directional antennas that aim the energy of a signal in either a general or specific direction towards another directional antenna connected to a transmitter/receiver. The most common type of antenna used in both SATCOM and terrestrial communications is a parabolic reflector with a waveguide feed located at the focal point of the parabola. These antennas are highly effective in networks where both the antenna and the distant end antenna are both stationary, such as in the case of a Geosynchronous Earth Orbit (GEO) satellite, or a microwave point-to-point link between two buildings or a building and a tower.

New satellite constellations that operate in Non-Geostationary Satellite Orbit (NGSO), specifically in Medium Earth Orbit (MEO) and Low Earth Orbit (LEO), as well as the increasingly ubiquitous implementation of terrestrial communications systems that require line-of-sight and non-line-of-sight beam-steering base stations with multiple beams of energy being radiated simultaneously are challenging the paradigm of single-beam, mechanically articulated parabolic reflector antennas. Several new and innovative solutions involving Electronically Steerable Array (ESA) antennas and, more specifically, Active ESA (AESA) antennas have been developed by companies such as Gilat, Phasor, and Boeing. The value these terminals bring to the marketplace is their inherent ability to direct one or several energy beams in different directions without any moving parts, allowing installers to place an antenna in one position and have it connect to distant end antennas that are in motion, such as NGSO LEO and MEO communication satellites, and antennas attached to moving vehicles such as Unmanned Aerial Vehicles (UAVs) and manned aircraft. Furthermore, these antennas can be placed on a moving vehicle such as an airplane, naval vessel, or ground vehicle such as a train, automobile, and drone, and concurrently track a distant end antenna regardless of whether that antenna is also moving or not.

AESA antennas are inherently expensive due to the complexity of the circuitry being used and the vast volume of elements that must be employed to replicate the gain and directivity of a parabolic reflector. Furthermore, most implementations of AESA technology are narrow-bandwidth devices and are unable to operate across multiple frequencies simultaneously. There exists a need in the art for improved antennas for use in SATCOM.

SUMMARY OF VARIOUS EMBODIMENTS OF THE INVENTION

The invention provides a low-cost, hemi-spherical beam-scanning coverage, multi-beam, multi-band beamforming electronically steerable lens antenna for terrestrial wireless, satellite, and radar applications.

The present invention achieves technical advantages by using a multi-sided flattened Luneburg (Lüneburg) Lens that allows a direct connection to a flat radiating antenna device as opposed to a curved radiating antenna device. By connecting the Planar Ultra-wideband Modular Array (PUMA) antenna to the geometric (e.g., octagonal or decagonal shaped) flattened Luneburg Lens with a broadband anti-reflective layer, a new class of ultra-wideband lens antennas is created that allows for near hemispherical coverage patterns across multiple frequency ranges, ideal for terrestrial wireless, satellite, and radar applications.

The methods described herein comprise connecting the two elements by removing the top dielectric layer of the PUMA antenna and using the multi-sided flattened Luneburg Lens to match the impedance of the dipole elements of the PUMA to the Luneburg lens instead of matching the impedance to free space. By connecting the PUMA antenna to the Modified Luneburg Lens with the removal of the top dielectric layer of the PUMA, an easily manufacturable lens antenna that provides multiple simultaneous beams with high directivity and low side-lobes is created. Instead of using the PUMA as an array of feeds that create gain through phasing, one element of the PUMA is illuminated at a time in order to develop transmit and receive beam in the desired direction based on where the beam illuminates the lens. The spacing between the PUMA antenna and Modified Luneburg Lens is designed carefully to minimize sidelobes.

A phased array antenna, such as a patch array or slot array, requires multiple independent feed networks, each possessing their own phase shifters and other key elements, increasing the cost and complexity of the apparatus. By implementing PUMA Antenna elements feeding a multi-sided flattened Luneburg lens instead of a phased array antenna, no phase shifters are necessary, as well as no dielectric layer for the PUMA antenna. The inventors discovered that the approaches described herein simplify the antenna architecture and reduce cost substantially.

In an embodiment, a modified Luneburg lens antenna may comprise flattened side surfaces and a flat bottom. The modified Luneburg lens antenna may have 4, 6, 8, 10, or 12 flattened side surfaces. The flattened side surfaces may be in the lower hemisphere of the lens. The flattened side surfaces may be arraigned around the circumference of the modified Luneburg lens.

In an embodiment, the flattened side surfaces may be configured with a broadband anti-reflective (AR) layer. The anti-reflective layer may have an inhomogeneous graded dielectric permittivity profile. The inhomogeneous graded dielectric permittivity profile may be Klopfenstein, Exponential, Gaussian, or Triangular.

In an embodiment, the flattened side surfaces may be configured with Planar Ultrawideband Modular Arrays (PUMA).

In an embodiment, the Luneburg lens may achieve multiple simultaneous beams on a 180° elevation plane and 360° azimuthal plane, optionally with high gain and low sidelobes.

In an embodiment, the Luneburg lens may have an increased aperture efficiency of more than about 80%.

In an embodiment, the intersection of the adjacent scanned beams may be designed to be about 1 dB-3 dB below to peak gain value.

In an embodiment, the Luneburg lens may have a wideband frequency coverage, optionally 6:1 bandwidth ratio, allowing for operation in multiple frequency bands simultaneously.

In an embodiment, the Luneburg lens may be configured for multiple simultaneous beams.

In an embodiment, the Luneburg lens may be configured to provide up to +/−90 degrees of sky coverage in a semi-hemispherical pattern.

In an embodiment, the flattened side surfaces may be configured with ultra-wideband (UWB) antenna structure. The UWB antenna structure may be matched to the lens via an anti-reflective layer. The anti-reflective layer may have an inhomogeneous graded dielectric permittivity profile. The inhomogeneous graded dielectric permittivity profile may be Klopfenstein, Exponential, Gaussian, or Triangular.

In an embodiment, the individual elements of the UWB antenna may function as individual feeds for individual beams aimed in separate directions through the lens.

In an embodiment, a method for manufacturing a modified Luneburg lens may comprise connecting the modified Luneburg lens to a PUMA antenna comprising removing the top dielectric layer of the PUMA antenna and using the multi-sided flattened Luneburg Lens to match the impedance of the dipole elements of the PUMA to the Luneburg lens. The method may not comprise matching the impedance to free space.

BRIEF DESCRIPTION OF THE DRAWINGS

The advantages and features of the present invention will become better understood with reference to the following more detailed description taken in conjunction with the accompanying drawings.

DETAILED DESCRIPTION OF PREFERRED EMBODIMENTS

Beam Forming Lens

Figure 1:
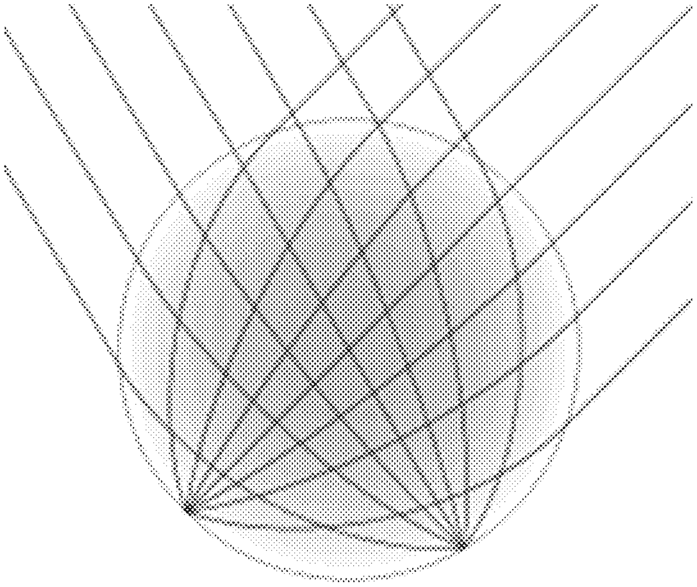
FIG. 1 illustrates a particular implementation of a Luneburg Lens, showing two different points of excitation and two beams being formed through the lens.
Figure 2:
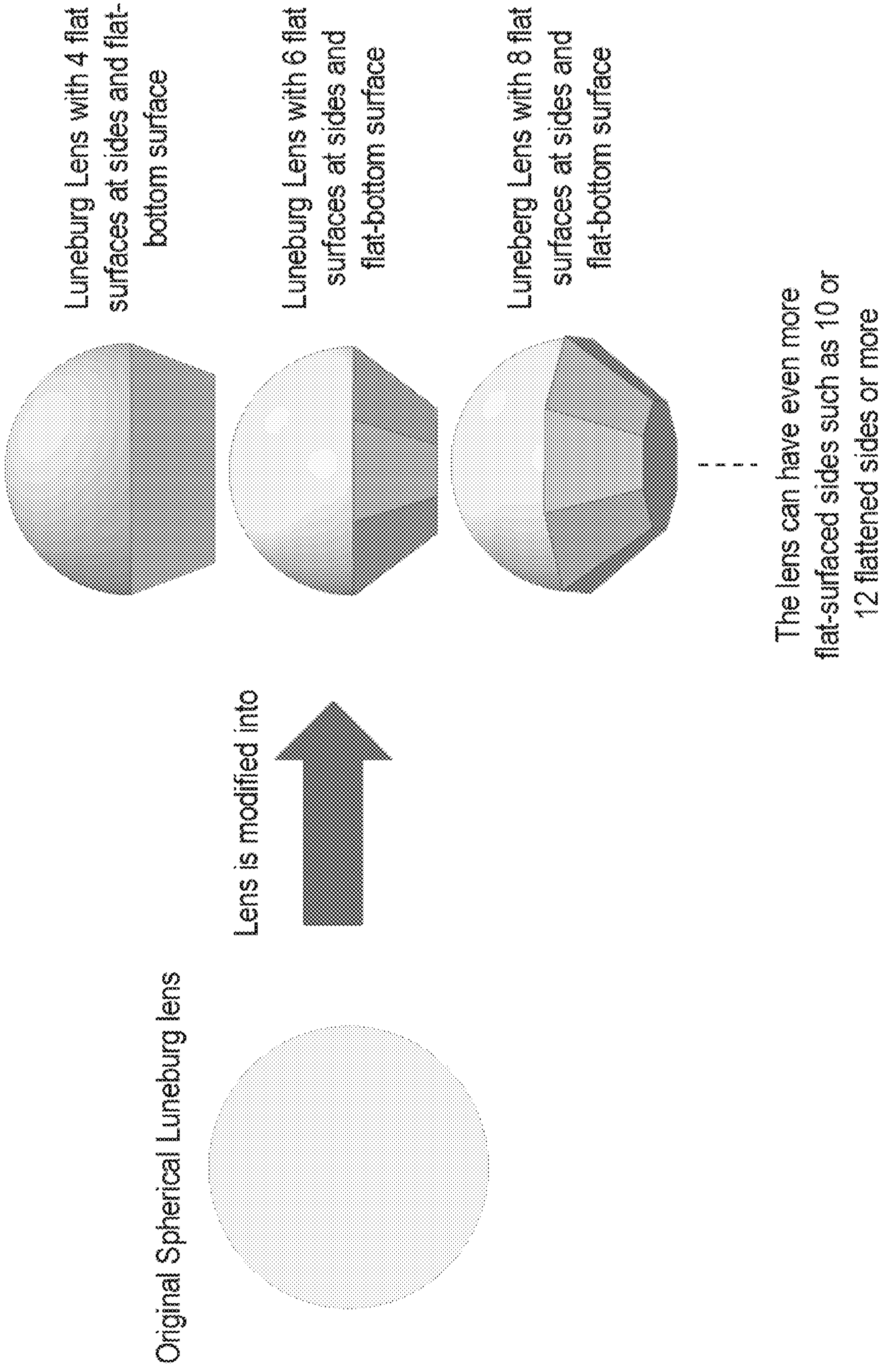
FIG. 2 depicts a flat sided Luneburg lens design, showing spherical Luneburg lens modified into multiple flat-surfaced lenses. The Luneburg lens may have 4, 6, 8, 10, or 12 flattened sides. The modified Luneburg lens has a flattened feed surface at the bottom and multiple flattened surfaces at the sides surrounding the lens. This allows for the housing of a maximum number of feed elements along the lens's surfaces using multiple flattened sides instead of one single flattened bottom surface.

An alternative class of antennas, specifically lens-based antennas, have existed in theory since 1854 when J. C. Maxwell proposed the fish-eye lens. Rudolf Luneburg proposed another lens solution which bears his name in 1944. R. K. Luneburg, Mathematical Theory of Optics. Providence, RI: Brown Univ. Press, 1944.

Conventional spherical lens antennas are ideally suited for multi-beam applications as they allow signals to travel through them at many various angles without interfering with one another. However, they are difficult and expensive to manufacture as the radio energy feed assemblages must be connected to the lens around the lower hemisphere, requiring a physical connection to various points along a curved surface. This makes it difficult to move a signal from one portion of the lens to another, usually requiring a complex mechanically driven moving feed assemblage. Multiple beams are even more difficult as the various moving mechanical assemblages must not interfere with one another.

A new type of radio frequency optical lens, called a Modified Luneburg Lens, uses transformational optic (TO) mathematics to flatten the portion of the lower hemisphere of the spherical lens, allowing for a flat printed circuit board antenna feed to be connected to the lower hemisphere of the lens. The Modified Luneburg Lens has an inherently broadband nature to the device, allowing for signals in a plurality of octaves to transit the lens in the desired directions.

To date there has been no mechanism for connecting this lens to an ultra-wideband (UWB) antenna that can also transmit and receive signals in a plurality of octaves in frequency through many or all of the antenna ports of the Modified Luneburg Lens.

A new class of ultra-wideband antennas, one of which is called a Planar Ultrawideband Multiband Antenna (PUMA), use a unique configuration of dipoles in order to create a broadband antenna that can transmit and receive radio signals in a plurality of octaves of frequency. U.S. Patent Application Publication No. 2012/0146869.

While UWB antennas such as the PUMA are able to transmit multiple beams simultaneously, the scan angle of the PUMA is only +/−55 degrees from boresite (zenith), below which the radiated signal begins to degrade in both insertion loss and axial ratio. Furthermore, the PUMA is typically used as an array of antennas and has not been connected to a lens to create a broadband lens antenna system.

UWB antennas and Luneburg Lenses have not been successfully connected to one another before. The challenge in doing so resides in connecting a flat array antenna to a spherical object, and matching the impedance of the UWB antenna to the Luneburg Lens, as typically both devices must have their impedance match free space, requiring competing dielectric layers and creating a complex matching challenge.

Embodiments of the present disclosure provide systems and methods that enable an ultra-wideband, high-gain, wide-angle, multi-beam antenna/lens system that creates an electronically steered array (ESA) lens antenna.

Modified Luneburg Lens for Beamforming & Beam-steering

Due to the inherent property of essentially infinite focal points, a Luneburg Lens may be used in an antenna because it can focus on radio waves emanating from any direction. From a practical standpoint, there are three characteristics of a real lens that present challenges.

(1) Since the lens is spherical, the feeds must be attached to the outside of a round structure. This requires an elaborate three-dimensional structure to be created to support these feed assemblages. This most often involves a manual process or a complex automated process to assemble and align the structure. This increases cost.

(2) For traditional feeds such as horn and patch antennas, the lens structure presents a radio frequency (RF) impedance to the feed. In order to match the feed to the structure, an RF matching network must be designed in order to achieve acceptable performance when the feed is mated to the antenna. Both RF matching networks and traditional feeds tend to be limited in bandwidth. If constructed properly, the lens itself is broadband, but the resulting antenna assembly is narrowband due to the limitations of the feed and the match.

(3) Since the dielectric is non-uniform, manufacture the lens is difficult. Approximations of Luneburg lenses are made using layers of dielectric materials with varying dielectric constants, however making a lens with a continuously varying dielectric constant has not been described.

Modified Luneburg Lens Manufacturing Methods

Methods for designing and manufacturing a Modified Luneburg lens that has both a non-uniform and non-circular varying dielectric constant are described herein. The problem of having to feed the lens with a circular (non-planar) feed arrangement may be solved by using transformational optics (TO) mathematics to transform the feed surface from one that is round to one that is flat (planar). Manufacturing a flat (planar) feed structure may be done using printed circuit board development techniques known in the art.

The problem of manufacturing the continuously-varying dielectric lens may be solved by using additive manufacturing (also known as three-dimensional (3D) printing) to create a structure with a non-homogenous dielectric constant. The additive manufacturing process may be used to create a structure that incorporates small air gaps of varying size within the dielectric material. If the air gaps and the dielectric structure are small with respect to the wavelength of the desired signal, the structure approximates a dielectric constant of 1.0. If the dielectric constant of the structure material is 3.0, the range of possible dielectric constants in the structure can vary from 3.0 (no air pockets) to close to 1.0 (very small amounts of dielectric material with mostly air gaps). The printing process builds the structure with small individual blocks called "cells" and allows the dielectric constant to be varied on a cell-by-cell basis. The cells can be small with respect to the wavelength of the signal, so good granularity in the gradient of the dielectric constant is achievable.

If the air gaps and the dielectric structure are small with respect to the wavelength of the desired signal, the structure approximates a dielectric constant of 1.0. If the dielectric constant of the structure material is 3.0, the range of possible dielectric constants in the structure can vary from 3.0 (substantially no air pockets in the material) to close to 1.0 (a small amount of dielectric material as compared to large amount air gaps). For example, a structure with a dielectric constant of around 3.0 would be substantially free of air pockets in the material. In contrast, a structure with a dielectric constant around 1.0 may comprise a larger amount of air gaps than dielectric material, e.g., the material will be mostly air gaps by volume.

A specific problem with Luneburg lenses is the match between the feed and the lens. Instead of attaching the feed directly to the lens, which has a varying match to the feed from center to the edge of the flat part of the structure, an interface layer (referred to as an 'anti-reflective layer') may be inserted between the feed and the modified lens. This layer designed so that a good match between the feed and the lens is obtained across the entire interface surface.

A multiple flat sided modified Luneburg Lens antenna can provide a broadband and hemi-spherical coverage. The Modified Luneburg Lens antenna may have a geometric shape, e.g., a CupCake shape, comprising a flat surface at the bottom and multiple flat surfaces at the sides to manipulate the signal directivity of a radio frequency transmission or reception of interest in a plurality of octaves of bandwidth. The modified Luneburg lens may be quadrilateral (4 flat side surfaces), hexagonal (6 flat side surfaces), octagonal (8 flat side surfaces), decagon (10 flat side surfaces), or dodecagon (12 flat side surfaces) in shape.

The antenna may be coupled to a Planar Ultra-Wideband Modular Array (PUMA) Antenna array structure with a broadband anti-reflective layer added between the two devices. The anti-reflective layer marries the two devices (lens and PUMA) and creates a broadband impedance matching between the new modified Luneburg lens antenna and dipoles of the PUMA array while maintaining the capability of the system to transmit and receive signals in a plurality of octaves of bandwidth.

Ultrawideband (UWB) Array Antenna Structure

An ongoing challenge with flat panel and phased array antennas has been to develop an antenna that is both ultra-wideband (UWB) and easily manufacturable. There exist antennas that are wideband but not easily manufacturable (such as the Vivaldi array) and there are many different flat panel antennas that are easily manufactured but which only operate over one or two frequency bands.

An antenna called the Planar Ultrawideband Modular Array (PUMA) that is both wideband (6:1 bandwidth) which is also manufacturable using standard Printed Circuit Board (PCB) processes by board houses using standard materials such as Rogers 3000 and 6000. U.S. Patent Application Publication No. 2012/0146869.

UWB antennas such as the PUMA have the following properties that make them interesting for SATCOM and terrestrial microwave communications: (a) they can be manufactured by different PCB board houses using standard PCB processes; (b) they can be made to operate UWB (6:1 bandwidth ratios are common); and (c) they retain good cross-polarization and gain performance up to 60 degrees scanned off-axis from boresite.

Figure 6:
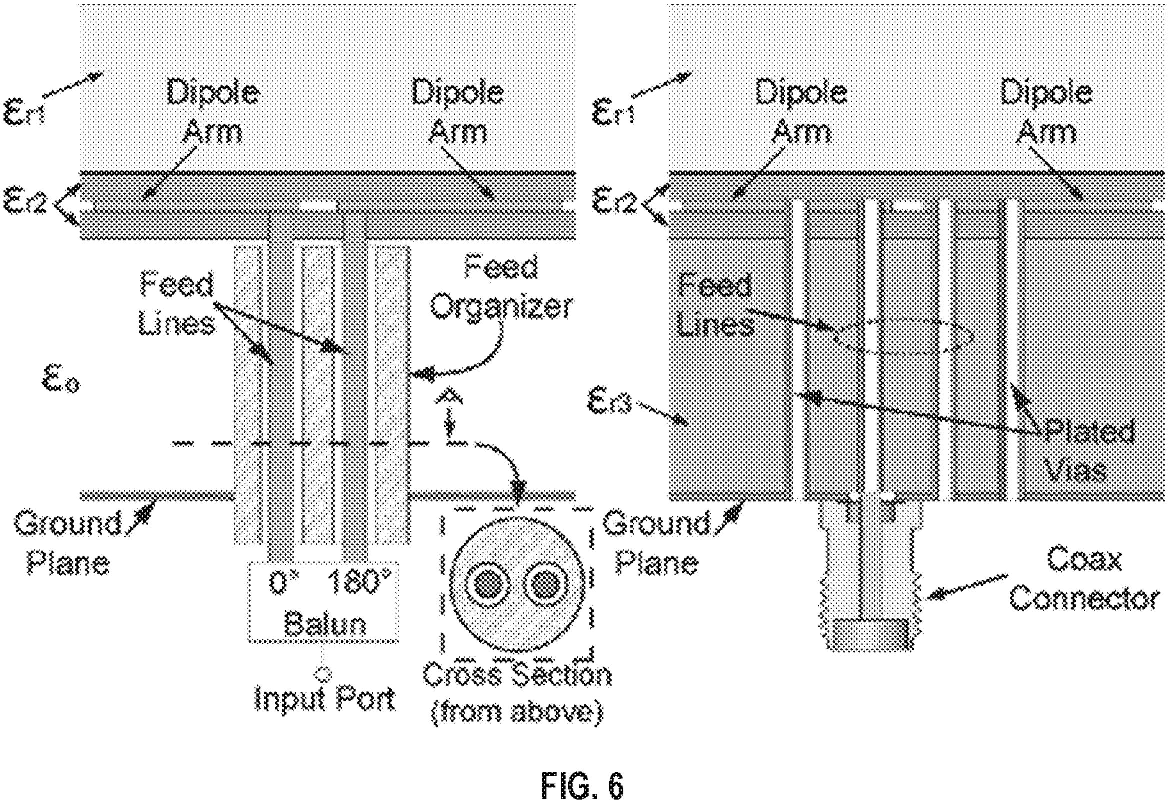
FIG. 6 is PUMA single element topology. In an embodiment, the modified Luneburg lens may comprise flattened sides configured with Planar Ultrawideband Modular Arrays (PUMA) configured as feed sources.
Figure 7:
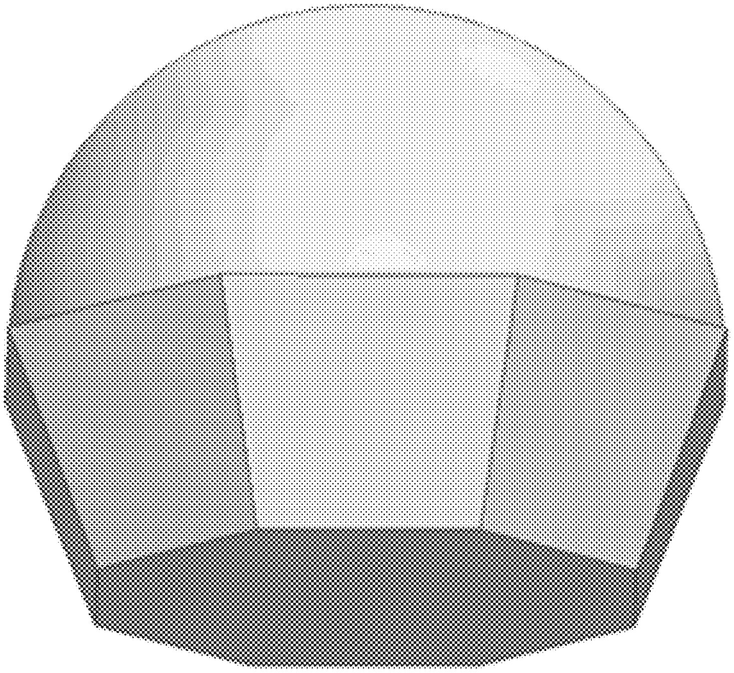
FIG. 7 depicts an octagonal shaped Luneburg lens (8 flattened sides) with a flat bottom.
Figure 8:
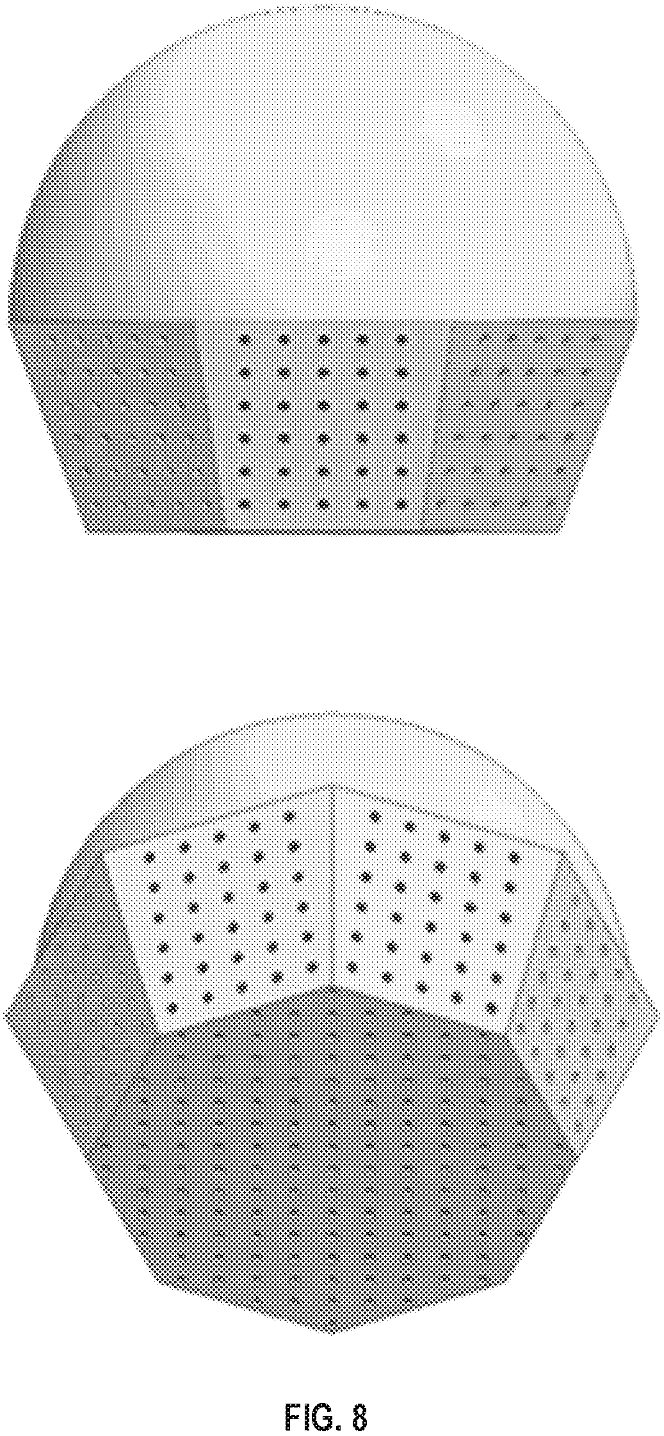
FIG. 8 depicts a hexagonal shaped Luneburg lens (6 flattened sides) with a flat bottom [top] and an octagonal shaped Luneburg lens (8 flattened sides) with a flat bottom [bottom].
Figure 10:
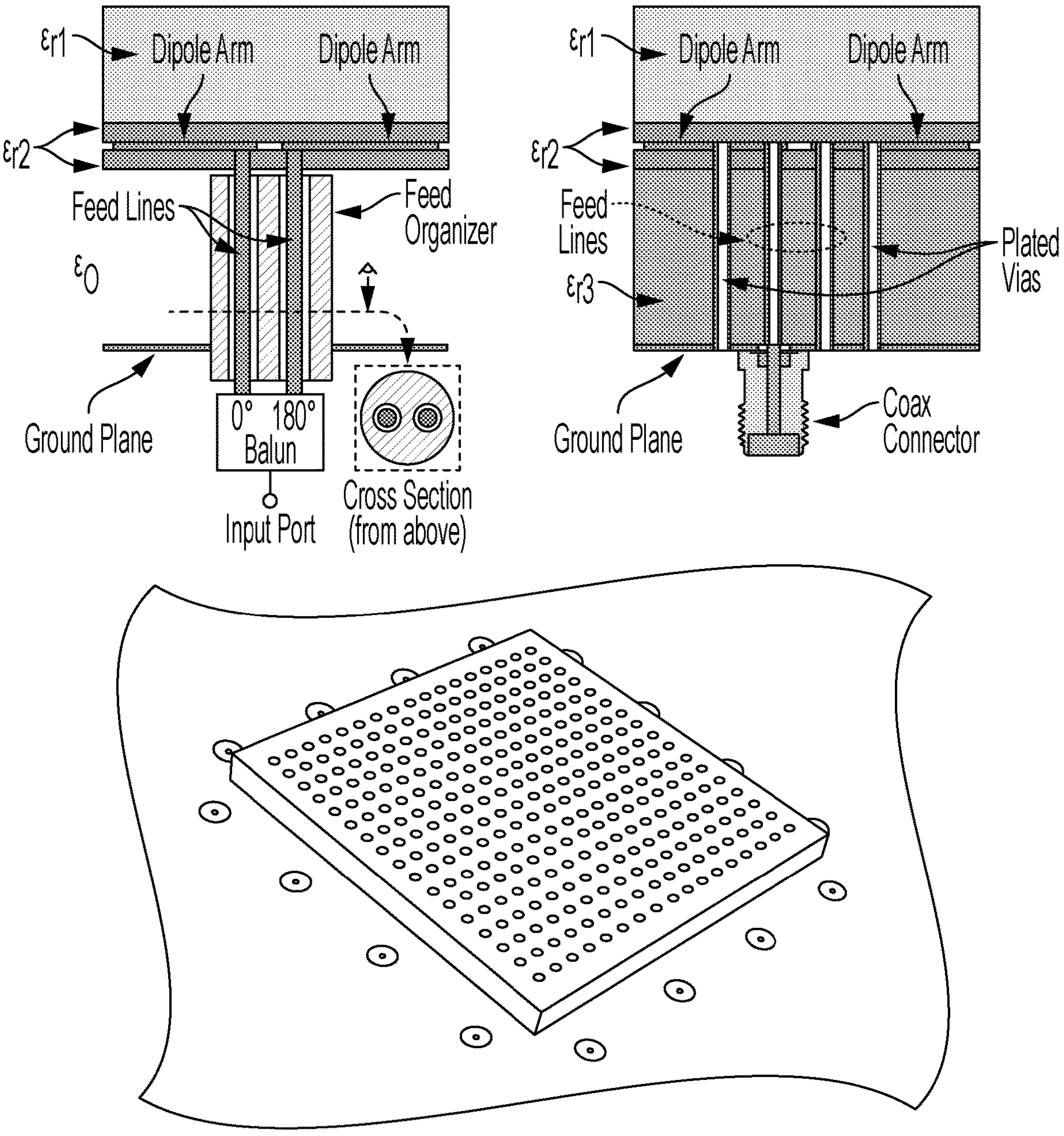
FIG. 10 depicts a PUMA architecture accordingly to an embodiment. In an embodiment, the modified Luneburg lens may comprise flattened sides configured with Planar Ultrawideband Modular Arrays (PUMA) configured as feed sources.

FIGS. 6 and 10 depict exemplary structures of a PUMA antenna. There is a trace layer, shown in FIG. 6 as Dipole Arms suspended above a ground plane by a dielectric layer and connected with vias to the layer shown as the ground plane. Above the trace layer there is an additional dielectric layer shown in FIG. 6. The spacing of the trace layer above the ground plane and the thickness and chosen material of the dielectric layers determines the frequency, bandwidth, and performance of this class of antennas.

Connecting the Lens to the Array

The multiple flat sided modified UWB Luneburg Lens provides the following benefits: (a) A flat-faced feed interface; (b) Inherently very wideband; (c) These can now be manufactured using currently-available additive manufacturing techniques; (d) The shape of the lens inherently supports very wide-angle coverage (up to +/−90 degrees off boresite in a semi-hemispherical coverage pattern); and (e) The lens is inherently efficient (efficiencies of 80% or greater-on par with parabolic reflectors).

The UWB antenna class such as a PUMA provides the following benefits: (a) Extremely wideband (6:1 bandwidth ratio) operation with directive signals; (b) Excellent off-axis performance up to +/−60 degrees off boresite in a semi-hemispherical coverage pattern; and (c) Manufacturable using standard PBC fabrication techniques.

A new class of UWB Luneburg Lenses are described herein that provide a flat (planar) interface in the southern hemisphere of the lens and surrounding the bottom hemisphere to which an antenna can be mated and connect that to an UWB planar array such as the PUMA. This new class of UWB lens antennas utilizes a UWB antenna such as a PUMA as a feed network to illuminate several cells of the Modified Luneburg Lens simultaneously.

This new class of UWB lens antennas has the following properties, among other properties: (a) Wideband frequency coverage (6:1 bandwidth ratio) allowing for operation in multiple frequency bands simultaneously; (b) Multiple simultaneous beams (potentially complete sky coverage with enough beams illuminated simultaneously); (c) Wide area sky coverage (up to +/−90 degrees of sky coverage in a semi-hemispherical pattern; (d) No moving parts required to operate; (e) Excellent efficiency relative to other directive antenna solutions (such as parabolic reflectors); and (f) A flat interface between the Modified Luneburg Lens and the UWB Antenna.

Figure 3:
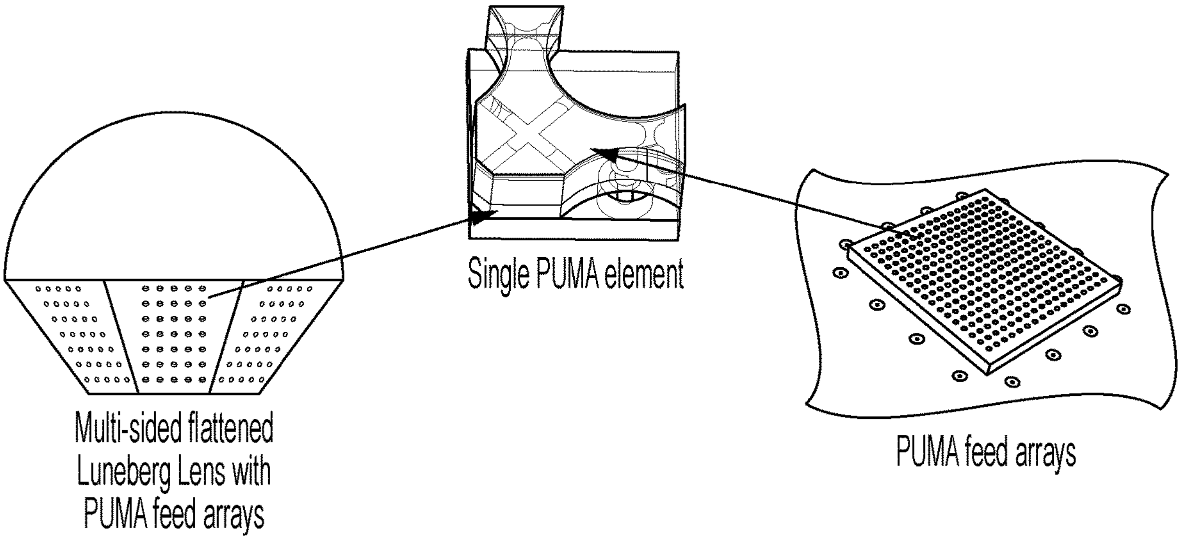
FIG. 3 depicts multiple flattened sided Luneburg lens with PUMA array. The Luneburg lens may have 4, 6, 8, 10, or 12 flattened sides. The surfaces may be configured with a broadband anti-reflective (AR) layer can be included with each flattened surface to minimize any possible impedance mismatches resulting from the permittivity mismatches between the lens and free space. The anti-reflective layer may have an inhomogeneous graded dielectric permittivity profile, e.g., Klopfenstein, Exponential, Gaussian, Triangular, to minimize the impedance mismatches between the flattened surface and feed sources.
Figure 4:
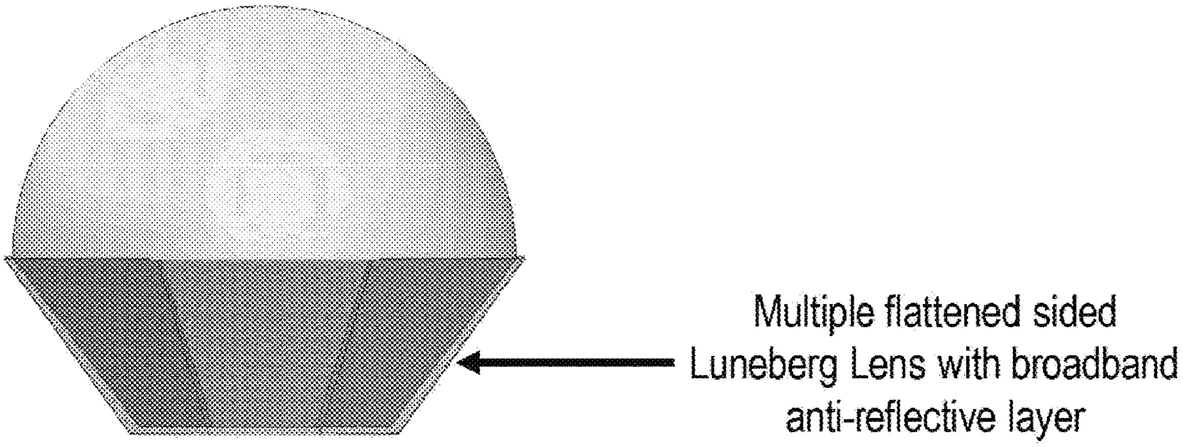
FIG. 4 depicts a multiple flattened sided Luneburg lens with anti-reflective layer incorporated around the flattened surface. The Luneburg lens may have 4, 6, 8, 10, or 12 flattened sides.
Figure 5:
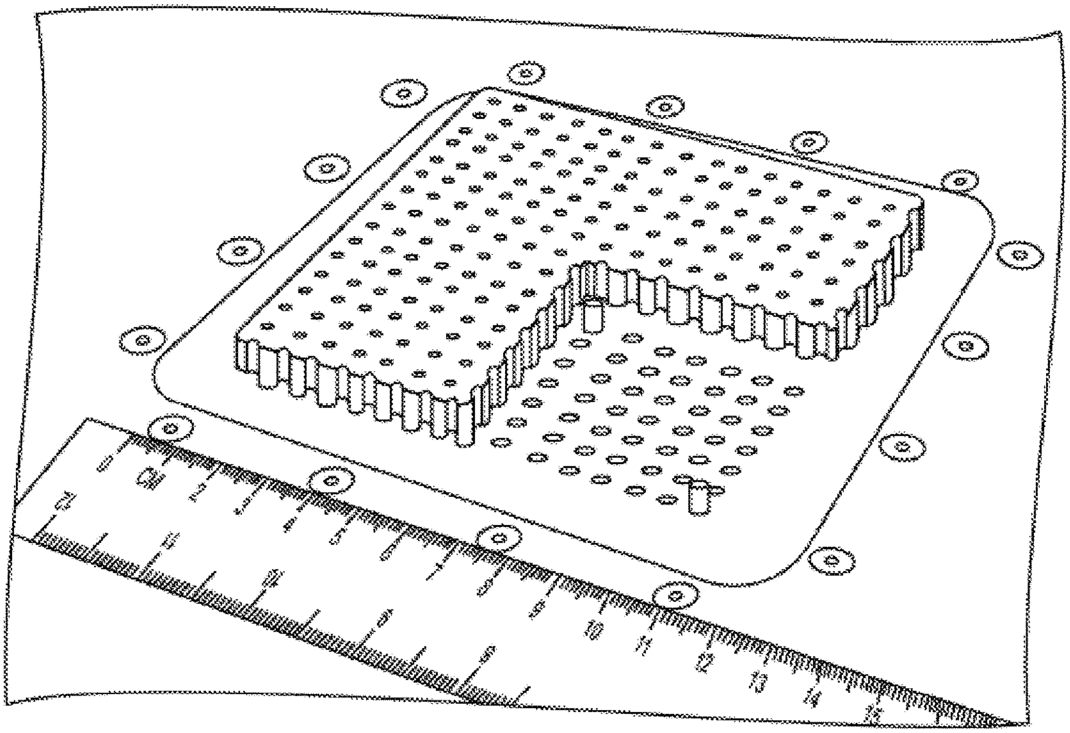
FIG. 5 depicts a PUMA array. In an embodiment, the modified Luneburg lens may comprise flattened sides configured with Planar Ultrawideband Modular Arrays (PUMA) configured as feed sources.
Figure 9:
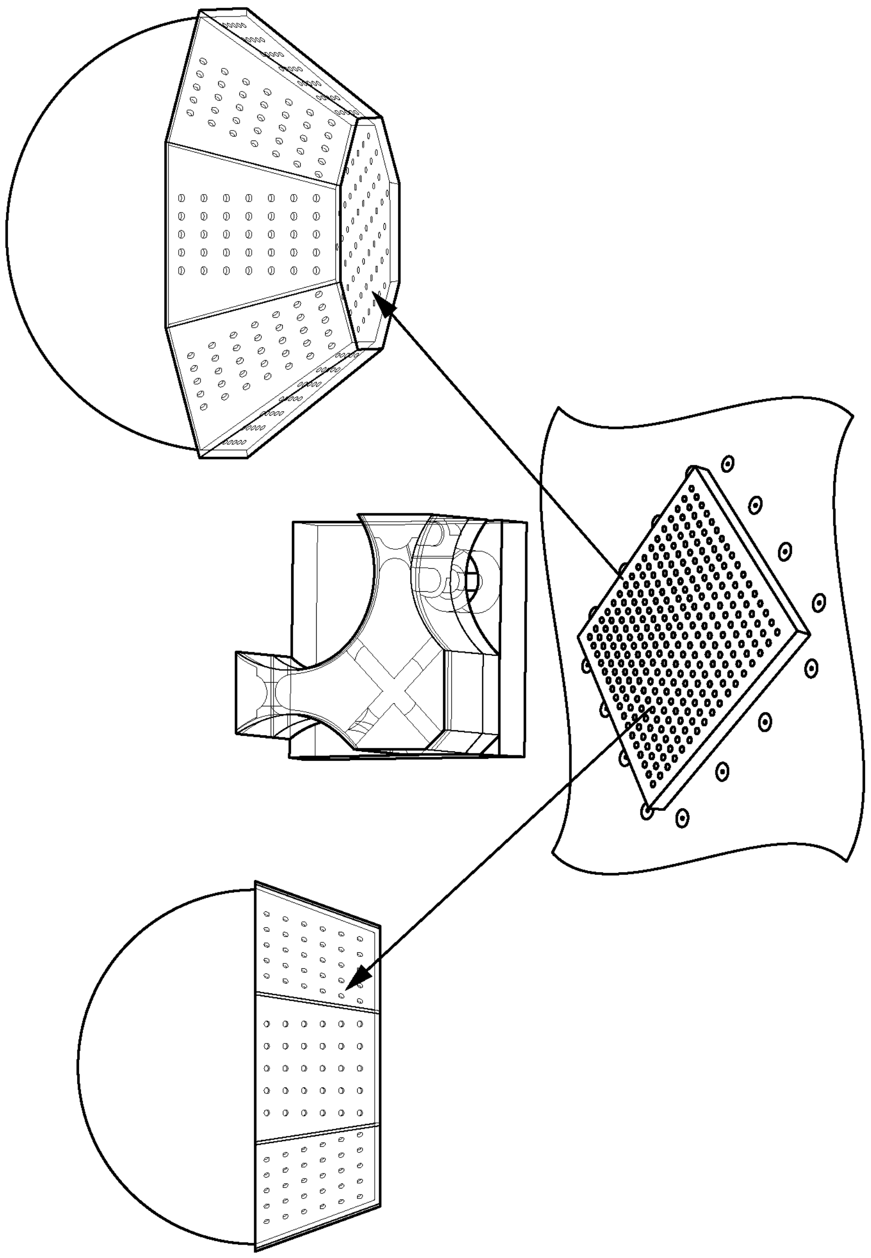
FIG. 9 depicts an octagonal shaped Luneburg lens (8 flattened sides) with a flat bottom configured with an anti-reflective layer and a PUMA feed network. The surfaces may be configured with a broadband anti-reflective (AR) layer can be included with each flattened surface to minimize any possible impedance mismatches resulting from the permittivity mismatches between the lens and free space. The anti-reflective layer may have an inhomogeneous graded dielectric permittivity profile, e.g., Klopfenstein, Exponential, Gaussian, Triangular, to minimize the impedance mismatches between the flattened surface and feed sources.
Figure 12:
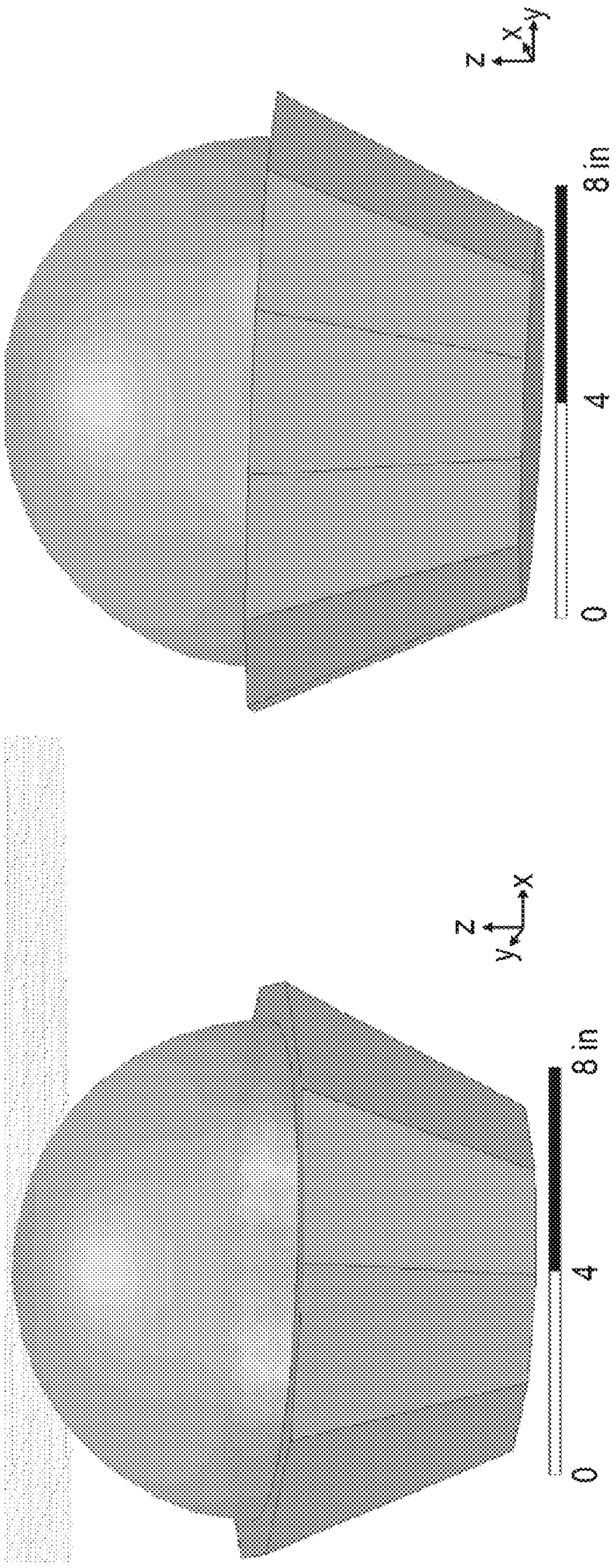
FIG. 12 depicts a decagonal shaped Luneburg lens (10 flattened sides) with a flat bottom [bottom] and depicts a dodecagonal shaped Luneburg lens (12 flattened sides) with a flat bottom [top]. The scale bars are for illustrative purposes only and are not intended to be limiting.

A high-level diagram of the proposed lens antenna system is depicted in FIGS. 3, 9, and 12. The figure depicts a multiple flat sided modified Luneburg lens fed by a PUMA antenna structure with or without an anti-reflective layer. The presence of the anti-reflective layer provides a broadband impedance matching and marry the two structures.

In a traditional UWB antenna such as a PUMA, the elements are spaced at one-half the wavelength at the highest frequency (λ/2). This is because the UWB antenna traditionally phase-combines multiple elements to create a phased array of antennas. In this implementation, the antenna is using one (or a small number of) feed element(s) to drive a single beam of energy. In the embodiments described herein, the UWB antenna is deviated from the traditional instantiation as follows: (a) The element location is dictated not by phased array formulas but instead by the location of the beams. Because of this, the elements will not necessarily be spaced at λ/2, and elements will not necessarily be evenly spaced, but instead match the appropriate mapping of the modified Luneburg lens to cover a cell of area that translates to a specific direction out of the lens. (b) In the traditional UWB antenna, adjacent elements interact with one another and this interaction is integral to the operation of the UWB antenna in a phased array application. In embodiments described herein, the elements can operate independently of adjacent elements, so the nature of the interaction between elements will be quite different.

In a traditional UWB antenna such as a PUMA, the top layer of the antenna is matched to air/free space. In embodiments described herein, the UWB antenna structure will be matched to the lens via the anti-reflective layer. Because of this, the UWB antenna structure design described herein deviates quite significantly from other UWB antennas in at least the following ways. (a) The top layer of dielectric in a UWB antenna design will be integrated into the anti-reflective layer, or it will be replaced entirely by the anti-reflective layer. There will exist a single layer of material between the dipole layers of the UWB antenna and the modified Luneburg lens. This layer will be designed to provide good matching between the UWB antenna and the modified Luneburg lens. (b) Because the lens and the anti-reflective layer may not be homogenous across the interface surface, it is possible that, in addition to being spaced differently, the UWB antenna elements may have different designs at different points across the surface. The design criteria for the antenna is to have well-behaved gain both spatially and across frequency. Having the ability to optimize the design of the lens, the anti-reflective layer, and the individual feed elements maximizes the efficiency and bandwidth of this invention.

Figure 11:
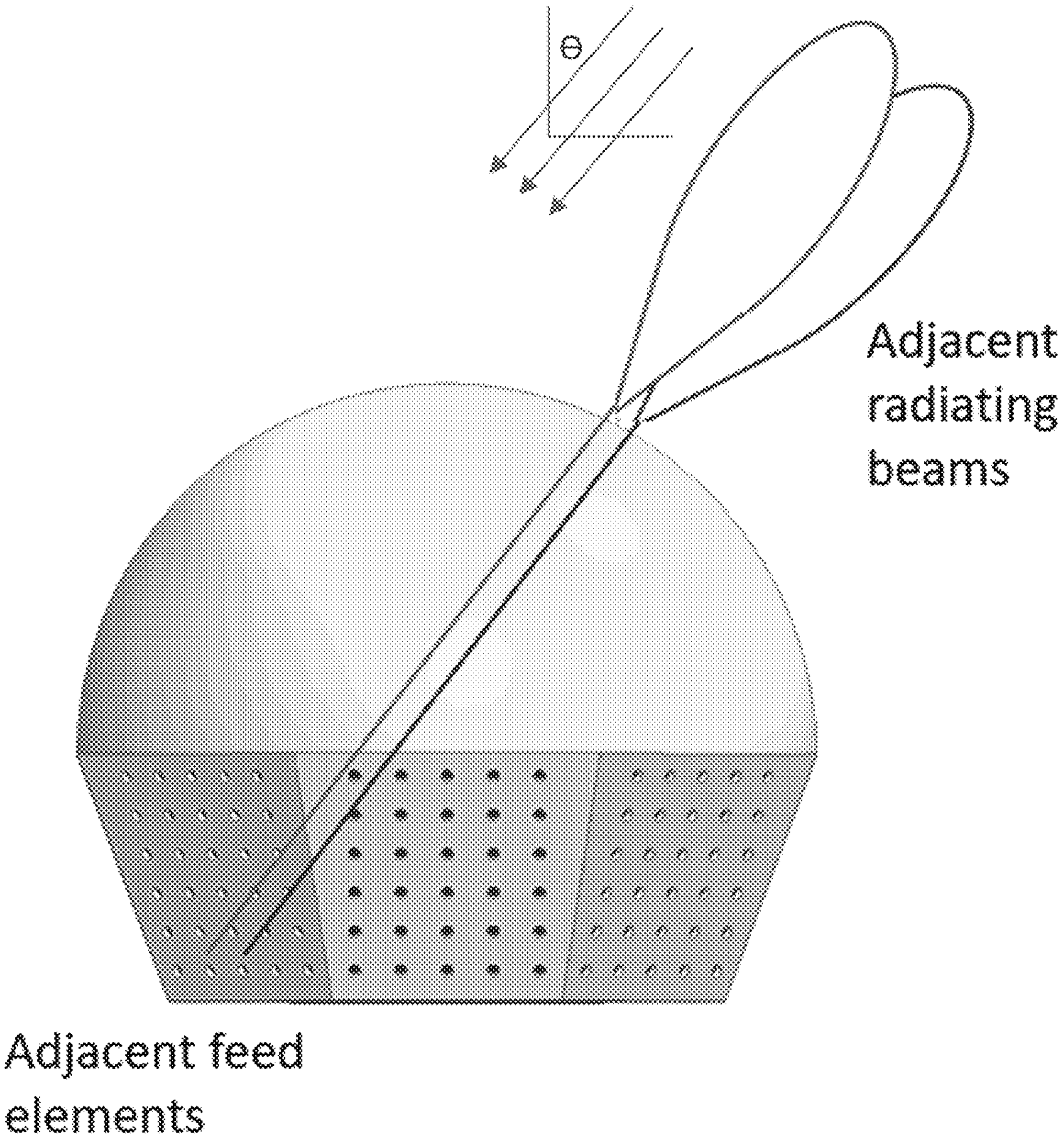
FIG. 11 depicts a hexagonal shaped Luneburg lens (6 flattened sides) with a flat bottom illustrating multiple simultaneous beamforming using lens antenna configured with a PUMA feed network.

In an embodiment, the UWB antenna array does not function as a phased array. Rather, individual elements of the UWB antenna function as individual feeds for individual beams aimed in separate directions through the lens. In FIG. 11, the relationship between the adjacent feeds and the adjacent beams is depicted. The lens and feed are designed in such a way that adjacent feeds will correspond to adjacent antenna beams. Assuming all elements are spaced correctly, the beams will overlap in such a way as to allow simultaneous illumination of an entire field of regard, in this case a field of roughly 60 degrees semi-hemispherical from boresite. By providing an RF switch matrix in the system that connects to all of the beam ports, a desired single beam can be selected. Alternatively by using multiple switch networks each having its own transmit receive modules, a number of beams can be illuminated simultaneously.

As an example, a 25-cm. (10-in.) antenna has a half power beamwidth on the order of 2.3 degrees at 30 GHz. For the coverage of +/−45 degrees, a total of approximately 675 beams and feeds are required. This is a circular array of UWB antenna feeds approximately 30 elements across. If the feed surface also has a diameter of 25-cm., the feeds are spaced on the order of 1-cm. apart.

The modified Luneburg lens antenna with PUMA may require low DC electrical power. In contrast, to achieve high beam scanning coverage with phased array, it requires multiple independent feed networks each having their own phase shifters. With the PUMA coupled to the flattened sides of the modified Luneburg lens described herein, no phase shifters are necessary.

The modified Luneburg lens antenna described herein may be configured for multiple simultaneous beams, potentially providing complete sky coverage with enough beams illuminated simultaneously.

The modified Luneburg lens antenna described herein may be configured to provide wide area sky coverage (e.g., up to +/−90 degrees of sky coverage in a semi-hemispherical pattern.)

The modified Luneburg lens fed by a PUMA antenna structure described herein may or may not have an anti-reflective layer. The presence of the anti-reflective layer provides a broadband impedance matching and marry the two structures.

The modified Luneburg lens antenna may have a wideband frequency coverage allowing for operation in multiple frequency bands simultaneously. The modified Luneberg lens antenna may have a 5:1 bandwidth ratio, 6:1 bandwidth ratio, 7:1 bandwidth ratio, 8:1 bandwidth ratio, 9:1 bandwidth ratio, 10:1 bandwidth ratio, 11:1 bandwidth ratio, 12:1 bandwidth ratio, 13:1 bandwidth ratio, or 15:1 bandwidth ratio.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Furthermore, it is understood that this invention is not limited to the particular methodology, materials and modifications described and as such may, of course, vary. It is also understood that the terminology used herein is for the purpose of describing particular aspects only and is not intended to limit the scope of the present invention, which is limited only by the appended claims.

Although the invention has been described in some detail by way of illustration and example for purposes of clarity of understanding, it should be understood that certain changes and modifications may be practiced within the scope of the appended claims. Modifications of the above-described modes for carrying out the invention that would be understood in view of the foregoing disclosure or made apparent with routine practice or implementation of the invention to persons of skill in electrical engineering, telecommunications, computer science, and/or related fields are intended to be within the scope of the following claims.

All publications (e.g., Non-Patent Literature), patents, patent application publications, and patent applications mentioned in this specification are indicative of the level of skill of those skilled in the art to which this invention pertains. All such publications (e.g., Non-Patent Literature), patents, patent application publications, and patent applications are herein incorporated by reference to the same extent as if each individual publication, patent, patent application publication, or patent application was specifically and individually indicated to be incorporated by reference.

The invention claimed is:

1. An ultra-wideband (UWB) Luneburg lens antenna comprising:

a Luneburg lens having multiple flat side surfaces and a flat bottom surface; and wherein each of the multiple flat side surfaces and the flat bottom surface is coupled to a Planar Ultrawideband Modular Array (PUMA) antenna.

2. The UWB Luneburg lens antenna of claim 1, wherein the lens has 4, 6, 8, 10, or 12 flat side surfaces.

3. The UWB Luneburg lens antenna of claim 1, wherein the flat side surfaces are in a lower hemisphere of the lens.

4. The UWB Luneburg lens antenna of claim 1, wherein the flat side surfaces are configured with a broadband anti-reflective (AR) layer.

5. The UWB Luneburg lens antenna of claim 4, wherein the anti-reflective layer has an inhomogeneous graded dielectric permittivity profile.

6. The UWB Luneburg lens antenna of claim 5, wherein the inhomogeneous graded dielectric permittivity profile is Klopfenstein, Exponential, Gaussian, or Triangular.

7. The UWB Luneburg lens antenna of claim 1, wherein the Luneburg lens can achieve multiple simultaneous beams on a 180° elevation plane and 360° azimuthal plane.

8. The UWB Luneburg lens antenna of claim 1, wherein the Luneburg lens has an increased aperture efficiency of more than 80%.

9. The UWB Luneburg lens antenna of claim 1, wherein the intersection of adjacent scanned beams can be designed to be about 1 dB-3 dB below to peak gain value.

10. The UWB Luneburg lens antenna of claim 1, wherein the Luneburg lens has a wideband frequency coverage allowing operation in multiple frequency bands simultaneously.

11. The UWB Luneburg lens antenna of claim 1, wherein the Luneburg lens is configured for multiple simultaneous beams.

12. The UWB Luneburg lens antenna of claim 1, wherein the Luneburg lens is configured to provide up to +/−90 degrees of sky coverage in a semi-hemispherical pattern.

13. The UWB Luneburg lens antenna of claim 1, wherein individual elements of the UWB antenna function as individual feeds for individual beams aimed in separate directions through the lens.

14. The UWB Luneburg lens antenna of claim 1, wherein each of the PUMA antennas are configured as feed sources.

15. A method for manufacturing a UWB Luneburg lens antenna comprising connecting a multi-sided flattened Luneburg lens to a PUMA antenna comprising removing a top dielectric layer of the PUMA antenna and using the multi-sided flattened Luneburg Lens to match the impedance of dipole elements of the PUMA antenna to the Luneburg lens.

16. The method of claim 15, wherein the method does not comprise matching the impedance to free space.

* * * * *